Jan. 15, 1929.
J. TULLY
1,699,413
METHOD OF ORNAMENTING PLATES OR BLOCKS
Filed Jan. 21, 1928
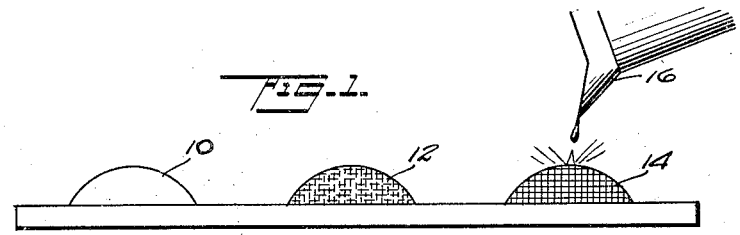
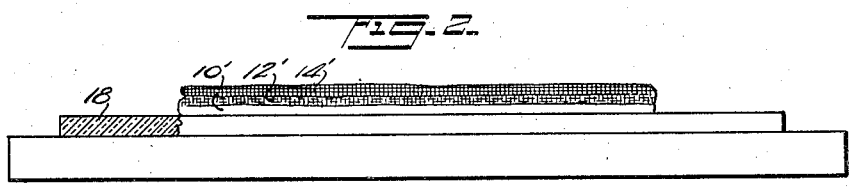
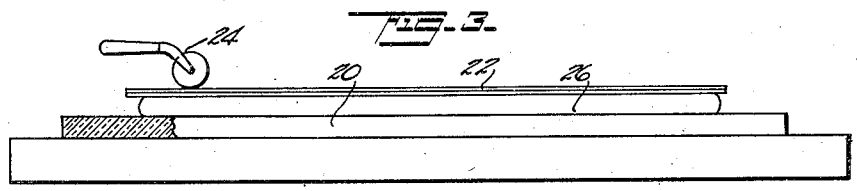
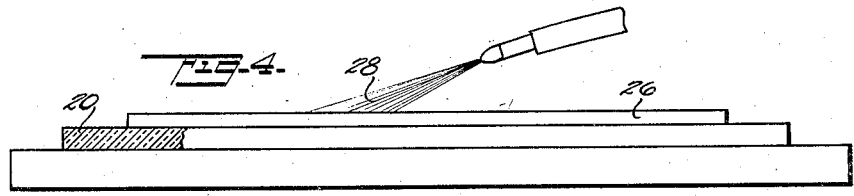
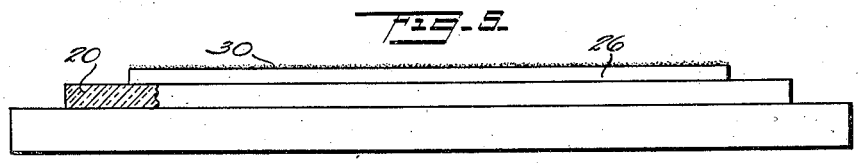
INVENTOR
JOHN TULLY
BY
ATTORNEYS.

Patented Jan. 15, 1929.

1,699,413

UNITED STATES PATENT OFFICE.

JOHN TULLY, OF PENSACOLA, FLORIDA.

METHOD OF ORNAMENTING PLATES OR BLOCKS.

Application filed January 21, 1928. Serial No. 248,564.

My invention relates to improvements in the art of ornamenting plates or blocks, preferably of diaphanous material, such as glass or the like, and the same has for its object, more particularly to provide a novel process which is readily performed, and which economically produces a durable, as well as ornamental, article.

Further, said invention has for its object, to provide a process which results in the production of an article ornamented to resemble marble, onyx or other characteristically colored and attractive natural substances.

Further, said invention has for its object, to provide a process in which various coloring substances are blended and applied to one side of a diaphanous block or plate to present, at the opposite side thereof, a variegated marbleized appearance, and a veining or intermingling of colors such as to resemble marble or other naturally colored stone.

Further, said invention has for its object, to produce an article having a film of blended colors on the plate thereof, impervious to moisture and not subject to deteriorating effects under ordinary atmospheric conditions, and permanently retaining its original intensity and brilliancy of coloring.

Further, said invention has for its object, to produce an article having a film of blended colors applied to the plate thereof, presenting a characteristic ornamental effect resulting from the blending thereof, and dried with the particles thereof permanently bound together and to said plate, to prevent shrinkage of the film and the deterioration thereof under atmospheric or other conditions.

Further, said invention has for its object, to provide a process in which the various colors are efficiently blended to ultimately produce the marbleized effect desired, and in which the blended colors are applied to and permanently secured upon the surface of the plate to render the article durable, without appreciably impairing the characteristic ornamental appearance thereof resulting from said blending.

Further, said invention has for its object, to produce an article having a film of blended colors applied to the plate thereof, and retained thereon by a suitable adhesive or binding substance incorporated with the colors after the blending operation, so that the use of said adhesive or binding substance in the colors during the blending operation is obviated, whereby to improve the results obtained in blending said colors, and to produce a durable article.

Other objects will, in part, be obvious, and in part be pointed out hereinafter.

To the attainment of the aforesaid objects and ends, my invention consists in the successive steps constituting the process as hereinafter more fully described, and then pointed out in the claims.

In the accompanying drawing:

Figure 1 is a view illustrating the first step of my method;

Fig. 2 is a view illustrating the partial blending step of said method;

Fig. 3 is a view illustrating the completion of the blending operation;

Fig. 4 is a view illustrating the application of the binder thereto; and

Fig. 5 is a view showing the final product.

In applying colored pigments upon glass or the like, blended as hereinafter described, I found that the presence of adhesive or binding substances therein, such as silicate of soda or potash resulted, upon the drying of the product, in considerable shrinkage of the colored film, and in the development of hair cracks therein, ultimately causing the film of colors to crack entirely, or causing pieces of glass to scale off with the colors. Even when the product was heated and paraffine applied thereto, the results were not satisfactory because of the solubility of the silicate. The use of chloride of lime or acids, to render the silicate insoluble and the product impervious to moisture, caused the colors to become dim and harsh, probably because of the presence of free soda therein.

Further, the use of the ordinary pigments used in painting, such as ready-mixed enamels of various colors, containing no silicate, was unsatisfactory because the mixtures were too thin and the desired blending could not be obtained, the colors tending to run together. The thickening of said fluid pigments by the addition of dry pigments thereto, to obtain the desired consistency, rendered the mixture difficult to spread, and the same being adhesive, owing to the gums or resins incorporated therein, caused the particles to adhere, resulting in the blending being blurred. Such thickened pigments, when applied to the glass, also cracked in drying, and retreated from the glass as soon as the solvents for the gums or resins evaporated. The following process overcomes the foregoing difficulties encountered:

In performing my process, I take any of the ordinary dry pigments 10, 12 and 14 used in the painting trade, and as indicated at 16 at Fig. 1 mix each color separately with turpentine, kerosene, or any fluid which will not unduly increase the cohesiveness of the mass, to the desired consistency, which should be that of a soft putty, varying in some degree according to the effect desired, the thinner mixture resulting in a more intimate blending of the colors, and the thicker mixture resulting in bolder effects. I take, for instance, a white which I desire for the dominant color, such as zinc white, barium (permanent white) white lead, china clay (kaolin) or any other well-known white, and mix it intimately with the fluid and lay it aside. I then take, for instance, a yellow, such as an ochre or chrome (or both if I desire special tints) or other yellow pigment, mix it and lay it aside. I then take, for instance, a black, such as manganese, lamp black or other black, alone or in combination with other blacks, and mix them and lay them aside. (I use these three colors as illustrations. There is, however, no limit to the possible color combinations.) The color mixture 10' (Fig. 2) for dominating the pattern or blended film is spread on a sheet of glass 18 (Fig. 2) or other available surface. The next more prominent color 12' desired, in varying lesser quantity than the dominant color, is now spread upon top of the first color, and the third color 14', which will be still less prominent, in still smaller quantity, is spread upon top of the other two colors. I can continue this process indefinitely, but I find that the use of from 3 to 5 colors is best because a certain harmony of color must be maintained to get pleasing effects.

The sheet-like mass, consisting of the chosen colors imposed one upon the other, is folded by turning one portion of the sheet of colors over the other portion, the sheet being folded in directions at right angles to each other, if desirable, to obtain better blending. This operation is continued if still more blending is desired.

The colors are now applied to a sheet of clean glass 20 (Fig. 3) or other transparent substance. With a knife or spatula, I take various sized portions or pieces of the partially blended mass and place them on the glass so that they will substantially cover the plate, when the pieces are rolled out, as in the next step in the process.

At this stage of the process the lumps or pieces of the mass on the plate, saturated with turpentine (I prefer turpentine because it is a solvent of the gums, oils or resins to be later introduced), are ready for the rolling or working process, which spreads the mass into an even sheet upon the glass and simultaneously continues and completes the blending of the colors.

For rolling the mass, I place over the same a sheet 22 of paper, like that used for newspaper printing, or a sheet of other porous material capable of absorbing moisture, and begin to suitably roll the same as indicated at 24 (Fig. 3). As the rolling, which is fairly gentle at the beginning, continues, the pieces of the colored mass are flattened and rolled, as indicated at 26, further blending the same, and the turpentine or other fluid is absorbed by the paper as the particles below the same become consolidated. If necessary, I add another sheet of paper to the one already under the roller, and the second sheet takes up portion of the fluid which is not absorbed by the first sheet. If necessary, I may use one or more additional sheets of paper, until the top one fails to show any evidence of further absorption. As a rule, three sheets suffice, although one would do if the same were thick enough. The object is to remove sufficient fluid from the mass to make room for the entry of the adhesive substance used in the next step. The use of paper also prevents the coloring material from sticking to the roller during this step in the process.

When the rolling is completed, the paper is removed, disclosing a fairly solid, closely compacted sheet 26 of blended colors on the glass 20, the film at the front being clean cut, and at the back possessing a rough appearance due to the rolling. The glass is now in condition, covered with a film of blended colors, having a small amount of fluid still incorporated therewith—about enough to wet the mass or film to make the particles temporarily cohere. If, at this stage, the sheet or film dries too much, it will crack, and fall apart or peel off of the glass, for, as yet, the same does not possess appreciable cohesive properties.

The next step, therefore, is to cause the colors on the glass to adhere to the same, and to render the film of colors impervious to moisture and unaffected by thermal and other atmospheric conditions.

For this purpose, I take a solution 28 (Fig. 4) of gum, resin or an oil, or a mixture of them having the general properties of the commercial varnishes or enamels, and apply one or more coats thereof to the back of the film of blended colors. The binding substance or varnish permeates or impregnates the pigments, and binds the colors to the glass or plate, the final result being the same as if the varnish and pigments were mixed in the usual way, prior to their application to the plate, and applied to the latter by hand, without, of course, the disadvantages above referred to. The result accomplished by my process, is practically the same, in so far as the durability, adhesiveness, etc., of the film is concerned, as is accomplished by applying a mixture of pigment and binding material to the glass, as by the ordinary brush, the difference being that the colors are blended in a manner impossible to accomplish by brush work, and such blending cannot be effectively accomplished using pigments having such binding substance incorporated therewith.

When the product is dry, I can, if desired, coat it again with the adhesive or binding substance, and sprinkle thereon sand 30 (Fig. 5) or similar inert substance and allow the film to dry. Thus sanded, the finished product is readily attached to other materials by plaster of Paris or other adhesives, and the sand also acts as a reinforcement. The article can, if desired, be further strengthened by a backing of plaster of Paris, Portland cement, mortar or the like to any required thickness secured to the surface thereof.

I claim:

1. The herein described process of ornamenting blocks or plates, which consists in taking masses of different colors, partially blending the same, spreading the partially blended masses over the surface of the block or plate to be ornamented, to complete the blending, and applying a binding substance to the resulting film of blended colors to cause the film to adhere to the block or plate.

2. The herein described process of ornamenting blocks or plates, which consists in taking masses of different colors without adhesives or binding substances being present therein, mixing said masses with each other to produce a blended mixture, applying the same to the surface of the block or plate to be ornamented, and producing a blended film of colors, and applying an adhesive or binding substance to said film for securing the film to the block or plate.

3. The herein described process of ornamenting blocks or plates, which consists in taking masses of different colors and incorporating in each thereof a fluid for controlling the consistency thereof without unduly increasing the cohesiveness of the mass, mixing together said color masses to produce a blending thereof, spreading the blended mixtures on the surface of the block or plate to be ornamented, and largely removing said fluid, and impregnating the resulting film of blended colors with a solution of a binding or adhesive substance for securing the film to said block or plate.

4. The herein described process of ornamenting blocks or plates, which consists in taking masses of different colors and incorporating in each thereof a fluid for controlling the consistency thereof without unduly increasing the cohesiveness of the mass, partially blending said masses of colors to produce a marbleized effect, placing portions of said partially blended mass over the surface of the block or plate to be ornamented, placing a sheet of absorbent material thereover, working the same to produce a film of blended colors presenting a marbleized effect, and to effect absorption of said fluid, impregnating the resulting film with a solution of a suitable binding substance, and drying the product.

5. The herein described process of ornamenting blocks or plates, which consists in taking masses of different colors, incorporating in each thereof a fluid for controlling the consistency thereof without unduly increasing the cohesiveness of the mass, spreading the masses of colors, one upon the other, folding one part thereof over the other part thereof to produce a partial blending of the colors, distributing portions of the partially blended colors over the surface of the block or plate to be ornamented, placing a sheet of absorbent material over said portions, and rolling the same until the blending operation is completed and said fluid is largely absorbed, and applying a varnish to the resulting film of blended colors.

6. The herein described process of ornamenting blocks or plates, which consists in taking masses of different colors, incorporating therein a fluid for controlling the consistency thereof without unduly increasing the cohesiveness thereof, spreading the masses, one upon the other, and folding the same to partially blend the same, producing a marbleized effect, placing portions of the partially blended material over the surface of a block or plate of diaphanous material, placing a sheet of absorbent material thereover, working the same to complete the blending, forming a film distributed uniformly over said block or plate and presenting a marbleized appearance, and to effect absorption of said fluid, impregnating the film with a solution of a binding substance, and drying the mass at ordinary temperatures.

7. The herein described process of ornamenting blocks or plates, which consists in taking masses of different colors, incorporating turpentine therewith to control the consistency thereof, effecting a partial blending of the masses of colors by spreading the masses, one over the other, and folding the same, placing portions of the partially blended masses over the surface of a block or plate of diaphanous material, placing a sheet of absorbent material thereover, rolling the same until the blending is completed, forming a film presenting a marbleized appearance, and until a large portion of said turpentine is absorbed, impregnating the resulting film with a varnish soluble in the portion of the turpentine remaining in said film, and drying the product.

8. The herein described process of ornamenting blocks or plates, which consists in taking masses of different colors, mixing the same to blend the same, applying the blended masses to the surface of a diaphanous block or plate to be ornamented, impregnating the resulting film of blended colors with a solution of a binding substance, and applying an inert substance to the impregnated film to provide a backing therefor for facilitating the attaching of the plate or block to another surface.

9. The herein described process of ornamenting blocks or plates, which consists in taking masses of different colors, incorporating therein a fluid for controlling the consistency thereof without unduly increasing the cohesiveness thereof, spreading said masses, one upon the other, and folding the same to partially blend the same, producing a marbleized effect, placing portions of said partially blended material upon the surface of a block or plate of diaphanous material, placing a sheet of absorbent material thereover, working the same to complete said blending, and to absorb said fluid, impregnating the resulting film with a solution of a binding substance, and applying a layer of sand thereto to provide a backing for facilitating the attaching of the plate or block to another surface.

In testimony whereof, I have signed my name hereto.

JOHN TULLY.